United States Patent [19]

Kiyohara

[11] Patent Number: 4,712,119

[45] Date of Patent: Dec. 8, 1987

[54] RECORDING APPARATUS HAVING PLURAL ADJUSTABLE RECORDING HEADS

[75] Inventor: Takehiko Kiyohara, Zama, Japan

[73] Assignee: Canon Kabushiki Kaisha, Tokyo, Japan

[21] Appl. No.: 797,522

[22] Filed: Nov. 13, 1985

[30] Foreign Application Priority Data

Nov. 19, 1984 [JP] Japan ................................ 59-244046
Nov. 19, 1984 [JP] Japan ................................ 59-244047

[51] Int. Cl.⁴ .............................................. G01D 15/16
[52] U.S. Cl. .............................. 346/140 R; 346/139 C
[58] Field of Search .............. 346/140, 75, 145, 139 C

[56] References Cited

U.S. PATENT DOCUMENTS

| | | | |
|---|---|---|---|
| 3,975,740 | 8/1976 | Distler | 346/75 |
| 4,277,790 | 7/1981 | Heibein | 346/75 |
| 4,342,042 | 7/1982 | Cruz-Uribe | 346/140 |
| 4,364,067 | 12/1982 | Koto | 346/140 |
| 4,477,823 | 10/1984 | Matsufuji et al. | 346/140 R |
| 4,540,996 | 9/1985 | Saito | 346/140 |
| 4,559,543 | 12/1985 | Toganoh, et al. | 346/140 R |
| 4,570,168 | 11/1986 | Sjordal | 346/140 X |

FOREIGN PATENT DOCUMENTS

| | | |
|---|---|---|
| 56-62180 | 5/1981 | Japan . |
| 58-188661 | 11/1983 | Japan . |

OTHER PUBLICATIONS

Denny, C. H., Adjustable Ink Jet Head Assembly, IBM TDB, vol. 15, No. 9, Feb. 1973, pp. 2787-2788.

*Primary Examiner*—Joseph W. Hartary
*Attorney, Agent, or Firm*—Fitzpatrick, Cella, Harper & Scinto

[57] ABSTRACT

A recording apparatus in which a plurality of recording heads are mounted on a head mounting base fixed on a carriage movable along a paper sheet. The recording heads are individually mountable on the head mounting table, and individually adjustable in position. The right-to-left position of each head can be regulated by a head fixing member.

8 Claims, 6 Drawing Figures

RECORDING APPARATUS HAVING PLURAL ADJUSTABLE RECORDING HEADS

BACKGROUND OF THE INVENTION

1. Field of the Invention

The present invention relates to a head mounting structure of a recording apparatus such as a printer and, more particularly, to a head mounting structure which independently and accurately mounts a plurality of recording heads on a carriage moved along a paper sheet.

2. Description of the Prior Art

In recording apparatuses such as a printer or a facsimile system, a recording head is mounted on a carriage moved along a paper sheet, and a plurality of dot forming elements such as heating resistors or ink-jet nozzles of the recording head are driven based on a print data signal.

When color printing is performed by a recording apparatus of this type, a plurality of recording heads (e.g., four, i.e., black, red, blue and yellow heads) are mounted on the carriage. In this case, since color printing is achieved by overlapping a plurality of colors, the recording heads must be accurately aligned and mounted.

As a conventional structure for mounting a plurality of recording heads, a recording head unit structure integrated with a plurality of recording heads is used, and is aligned and fixed to the carriage.

However, when such an integrated structure is used, recording heads cannot be selectively exchanged. When one head malfunctions, all the heads must be exchanged. This cannot cope with various recording methods, and results in increased maintenance cost.

SUMMARY OF THE INVENTION

It is an object of the present invention to provide a recording head mounting structure which is free from the problems of the prior art apparatus, and can independently and easily exchange a plurality of recording heads and accurately mount them.

It is another object of the present invention to provide a recording apparatus suitable for color ink-jet printing.

These and other objects of the present invention will be apparent from the following detailed description of the preferred embodiment.

DETAILED DESCRIPTION OF THE PREFERRED EMBODIMENT

An embodiment of the present invention will be described with reference to the accompanying drawings.

Figure 1:
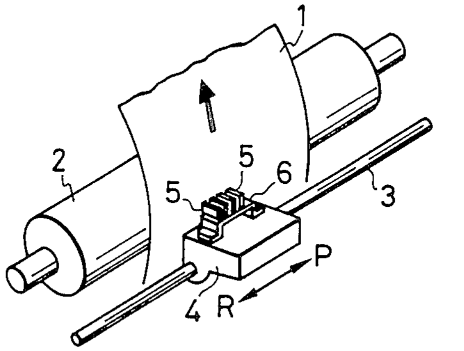
FIG. 1 is a plan view showing a recording apparatus according to an embodiment of the present invention.

FIG. 1 shows a main part of an ink-jet recording apparatus according to an embodiment of the present invention. A guide shaft 3 is arranged parrallel to and in front of a platen roller 2 for supporting a paper sheet 1 and feeding it at a constant pitch in a direction indicated by the arrow in FIG. 1. A carriage 4 is supported by the guide shaft 3 and reciprocates along the sheet 1 in the directions indicated by arrows R and P in FIG. 1. A plurality of ink-jet recording heads 5 (in this embodiment, four) are mounted on the carriage 4. These heads 5 are fixed to the carriage 4 through a head mounting base 6, as shown in FIGS. 1 to 5.

Each recording head 5 is supplied with an ink from an ink reservoir (not shown) disposed in the carriage 4 (movable side) or the apparatus main body (fixed side). When nozzles of the recording heads 5 are driven based on a print data signal (in a bubble-jet printer, they are heated), an ink is emitted to the sheet 1.

In a color printing recording apparatus, a plurality of recording heads (e.g., four, i.e., black, red, blue, and yellow heads) are used. When nozzles provided in front surfaces (printing surfaces) of the recording head are driven in accordance with a print data signal, color printing on the sheet 1 is performed. In particular, in the case of color printing, overlapping printing is performed by recording heads of different colors.

Referring to FIGS. 2 to 5, the single head mounting base 6 is adjustably fixed to the carriage 4. A pin 7 projecting from the lower surface of the base 6 is fitted in an elongated hole 8 formed in an upper surface of the carriage 4 and elongated in a back-and-forth direction (a direction separating/approaching the platen roller 2). In addition, the base 6 is fixed to the carriage 4 by screws 10 inserted in elongated holes 9 formed in two ends of the base 6. In this case, when the pin 7 is fitted in the hole 8, the position of the base 6 in a right-and-left direction (carriage running direction) is restricted. However, the position of the base 6 in the back-and-forth direction can be adjusted by the elongated holes 8 and 9. A pivoted position of the base 6 about the pin 7, i.e., a parallel state of the base 6 with respect to the platen roller 2 can be adjusted by the pin 7 and the elongated holes 9.

The recording heads 5 can be independently exchanged with respect to the base 6, and are accurately aligned thereto. The mounting structure of the recording heads will be described hereinafter.

A mounting surface 11 for restricting the vertical position of the recording head 5 and a projection 12 projecting downward from the level of the mounting surface 11 are formed on each recording head 5. Meanwhile, a supporting surface 13 abutting against the mounting surface 11 and four openings 14 (corresponding to the recording heads 5) each receiving a projection 12 are formed in the base 6.

A back-and-forth length of each opening 14 is set to be the same as that of the projection 12, and the opening 14 and the projection 12 are machined with high precision so as to tightly fit with each other.

The back-and-forth and vertical positions of each recording head 5 are restricted by the opening 14 and the supporting surface 13.

Figure 5:
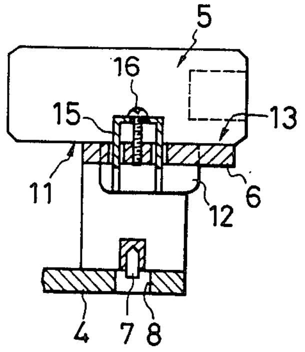
FIG. 5 is a sectional view taken along a line IV—IV in FIG. 3.

In order to mount (fix) the recording head 5 to the base 6, a wedge-shaped head fixing member 15 is used. The member 15 has a threaded hole having a larger diameter than that of a screw 16, and one member 15 is prepared for each recording head 5. As shown in FIG. 5, a tapered portion of the head fixing member 15 is inserted between one side surface of the opening 14 and the side surface of the recording head 5, and is fixed by the screw 16 screwed in the base 6. Thus, due to a wedge effect, the recording head is pressed against the one side surface of the opening 14.

When each recording head 5 is pressed against and fixed to the side surface of the corresponding opening 14 by the head fixing member 15, the right-and-left and vertical positions thereof are determined (i.e.. the head 5 is regulated in precise position and posture). Simultaneously, each head 5 is also aligned in the back-and-forth and vertical directions. In this manner, the recording heads 5 are separately but accurately fixed to the head mounting base 6.

Therefore, the nozzles 17 (FIG. 3) provided on the front surfaces of the recording heads 5 can be set at accurate positions, thus improving color printing quality obtained by overlapping original colors.

In this manner, when the base 6 is simply machined, the recording heads 5 can be independently and accurately mounted on the base 6 to be replaced.

Furthermore, since the base 6 is adjustably fixed to the carriage 4, its position relative to the platen roller 2 (including a parallel position) can be easily and precisely aligned by using a jig or a gauge block.

Thus, the positions of the nozzles 17 of the recording heads 5 relative to the platen roller 2 (or the sheet 1) can be precisely set. When overlapping printing as in color printing is performed, high quality recording free from color or dot misalignment can be performed.

If the housings (supporting member portion) of each recording head 5 and the head mounting base 6 are made of a material with good thermal conductivity, a heat radiating effect of the nozzles 17 is improved so as to maintain a constant temperature. In addition, printing speed and quality can be improved.

Figure 6:
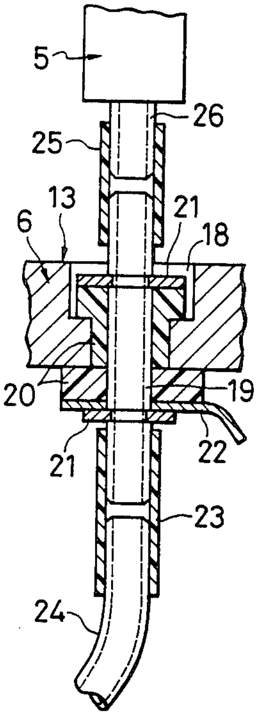
FIG. 6 is an enlarged sectional view taken along a line V—V in FIG. 3.

Furthermore, a connector, i.e., a connection structure of an ink supply tube shown in FIG. 6 is provided adjacent to each recording head 5 of the head mounting base 6 (i.e., four connectors are provided).

Referring to FIG. 6, a hollow pin 19 normally made of a metal is fitted in a stepped hole 18 formed in the base 6 through rubber elastic members 20. In an example shown in FIG. 6, stop rings 21 are looped around two circumferential grooves formed in the hollow pin 19. When the upper and lower rubber elastic members 20, the upper one of which is fitted in the stepped hole 18, are clamped by these stop rings 21, the hollow pin 19 can be mounted on the base 6 to be elastically displaceable. Note that in the example of FIG. 6, an electrode plate 22 for detecting the presence/absence of an ink in the ink supply tube, by utilizing conductivity of the ink, is clamped between the lower elastic member 20 and the lower stop ring 21.

An ink supply tube (e.g., a vinyl tube) 24 is connected from an ink reservoir to a lower end of the hollow pin 19 through a rubber tube 23. On the other hand, an upper end of the hollow pin 19 is connected to an ink supply tube 26 (including a projected connection member, as shown in FIG. 6) at the side of the recording head 5 through a rubber tube 25.

With the above-mentioned structure, when the head mounting base 6 is machined with simple process, the recording heads 5 can be independently fixed to the base 6 with high precision.

Furthermore, since the head mounting base 6 is mounted on the carriage 4 and adjusted in the back-and-forth and parallel positions, the position of the base 6 relative to the platen roller 2 (including a parallel position) can be easily and precisely adjusted using a jig or a gauge block. Thus, the positions of nozzles of the heads 5 relative to the platen roller 2 can be easily and precisely set. In this manner, color misalignment in color printing by overlapping three primary colors can be prevented, and printing quality can be improved.

If the housings (supporting member portion) of each recording head 5 and the head mounting base 6 are made of a material such as aluminum with a good heat radiating property, an increase in temperature of the nozzles 17 (in particular, when heated, as in a bubble-jet printer) and print error caused by a resulting ink state (viscosity) can be prevented.

Note that the carriage 4 and the recording heads 5 have shapes and structures suited to be used in an ink-jet recording apparatus. However, the technical principle of the present invention can be applied to recording apparatuses of other types such as a thermal type.

As is apparent from the above description, according to the present invention, a plurality of recording heads can be independently, easily and precisely aligned and fixed, thus improving printing quality.

When a plurality of recording heads are to be used as in color printing, an ink-jet recording apparatus can be provided in which each recording head can be easily and accurately aligned, and each recording head can be replaced independently of other heads.

I claim:

1. A recording apparatus comprising:
- a platen for recording;
- a carriage movable along said platen;
- a plurality of recording heads, each having a mounting surface and a projecting portion projected from said mounting surface;
- a head mounting member disposed on said carriage to mount thereon said plurality of recording heads, said head mounting member having a supporting surface contacting said mounting surface and a plurality of openings into each of which a corresponding said projecting portion tightly fits;
- a plurality of head supporting members for pressing respective said recording heads against a side surface of said corresponding opening; and
- adjusting means for adjusting the distance and the angular orientation of said head mounting member with respect to said platen.

2. An apparatus according to claim 1, wherein said plurality of recording heads are independently exchangeable.

3. An apparatus according to claim 1, wherein said adjusting means includes an elongated slot provided on the center of said carriage and a screw provided on said head mounting member and slideably cooperating with said slot and said screw adjustably defines the position of said head mounting member.

4. An apparatus according to claim 1, wherein each of said plurality of recording heads comprises a nozzle assembly for ink-jet type printing and an ink supply tube connector for supplying an ink to said nozzle assembly is provided on said head mounting member.

5. An apparatus according to claim 4, wherein said connector comprises an elastic material and is deformably mounted on said head mounting member.

6. An apparatus according to claim 1, wherein each of said plural openings in said head mounting member has a length the same as that of said corresponding projecting portion in one direction, so that each of said projecting portions tightly fits into said corresponding opening without clearance therebetween.

7. An apparatus according to claim 6, wherein each of said head supporting members presses said respective recording head in a direction different from said one direction.

8. A recording head apparatus comprising:

a platen for recording;

a carriage movable along said plate n;

a plurality of recording heads, each having a mounting surface and a projecting portion projected from said mounting surface;

a head mounting member disposed on said carriage, said head mounting member having a supporting surface and a plurality of openings into each of which a corresponding said projecting portion tightly fits, wherein said supporting surface restricts movement of said plurality of recording heads in an upward-downward direction and said openinigs position respective said recording heads in one of a forward, backward, upward and downward direction;

a plurality of head supporitng members for pressing respective said recording heads against a side of said corresponding opening, wherein said head supporting member regulates the movement of each said recording head in a direction other than said forward, backward, upward and downward directions to positively position each said recording head relative to said head mounting member in cooperation with said supporting surface and said corresponding opening; and adjusting means for adjusting the distance and the angular orientation of said head mounting member with respect to said platen, thereby integrally adjusting the position of all of said plurality of recording heads relative to said platen.

* * * * *

UNITED STATES PATENT AND TRADEMARK OFFICE

CERTIFICATE OF CORRECTION

PATENT NO. : 4,712,119

DATED : December 8, 1987

INVENTOR(S) : TAKEHIKO KIYOHARA

It is certified that error appears in the above-identified patent and that said Letters Patent is hereby corrected as shown below:

COLUMN 1

Figure 2:
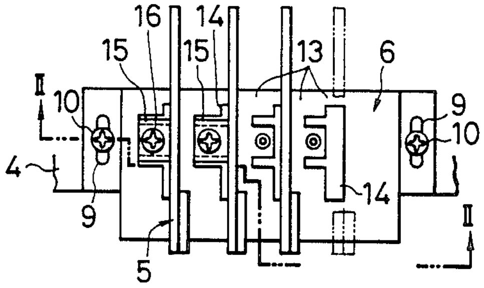
FIG. 2 is a partially cutaway plan view showing a recording head mounting portion of FIG. 1.
Figure 3:
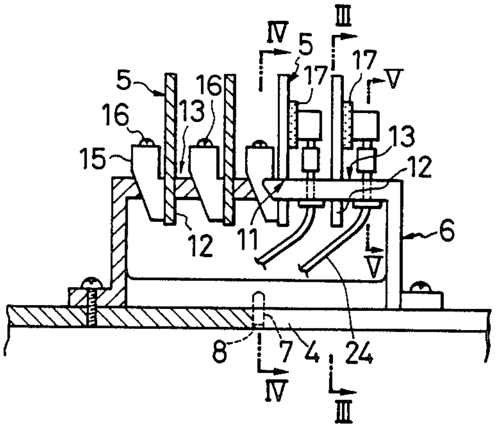
FIG. 3 is a partial sectional front view taken along a line II—II in FIG. 2.
Figure 4:
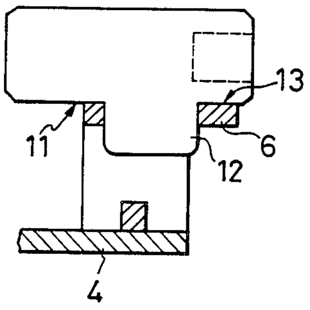
FIG. 4 is a sectional view taken along a line III—III in FIG. 3.

Line 57, "FIG. 2." should read --FIG. 2;--.

COLUMN 2

Line 18, "an" should be deleted.

COLUMN 5

Line 9, "plate n;" should read --platen;--.

COLUMN 6

Line 1, "openinigs" should read --openings--.
Line 4, "supporitng" should read --supporting--.

Signed and Sealed this

Tenth Day of May, 1988

*Attest:*

DONALD J. QUIGG

*Attesting Officer*

*Commissioner of Patents and Trademarks*